United States Patent [19]

Van Witteveen et al.

[11] 3,791,136

[45] Feb. 12, 1974

[54] HOT-GAS ENGINE

[75] Inventors: Roland Anton Johan Otto Van Witteveen; Gregorius Theodorus Maria Neelen, both of Emmasingel, Eindhoven, Netherlands

[73] Assignee: U.S. Phillips Corporation, New York, N.Y.

[22] Filed: Oct. 14, 1971

[21] Appl. No.: 189,336

Related U.S. Application Data

[63] Continuation of Ser. No. 026,639, April 8, 1970, abandoned.

[30] Foreign Application Priority Data

Apr. 18, 1969 Netherlands.................... 6906103

[52] U.S. Cl. ................................................. 60/24
[51] Int. Cl. ............................................. F02g 1/04
[58] Field of Search .................................... 60/24

[56] References Cited
UNITED STATES PATENTS 3,399,526  9/1968  Meijer..................................... 60/24
3,559,398  2/1971  Meijer et al. .......................... 60/24

*Primary Examiner*—Martin P. Schwadron
*Assistant Examiner*—Allen M. Ostrager
*Attorney, Agent, or Firm*—Frank R. Trifari

[57]  ABSTRACT

A hot-gas engine to which thermal energy is supplied by means of a heating system, which conducts a flow of heated medium along the heater and in which the heater is formed by a first wreath of pipes which communicate at their one end with the expansion space and at their other and communicate with further pipes which communicate with the regenerator and in which the further pipes are situated at least partly within a container in which a substance or a mixture of substances is present in which sensible and/or melting heat can be stored, the container comprising, in the zone over which the further pipes extend within the container, a number of ducts through which the heating medium flows away after passage of the first wreath of pipes.

8 Claims, 1 Drawing Figure

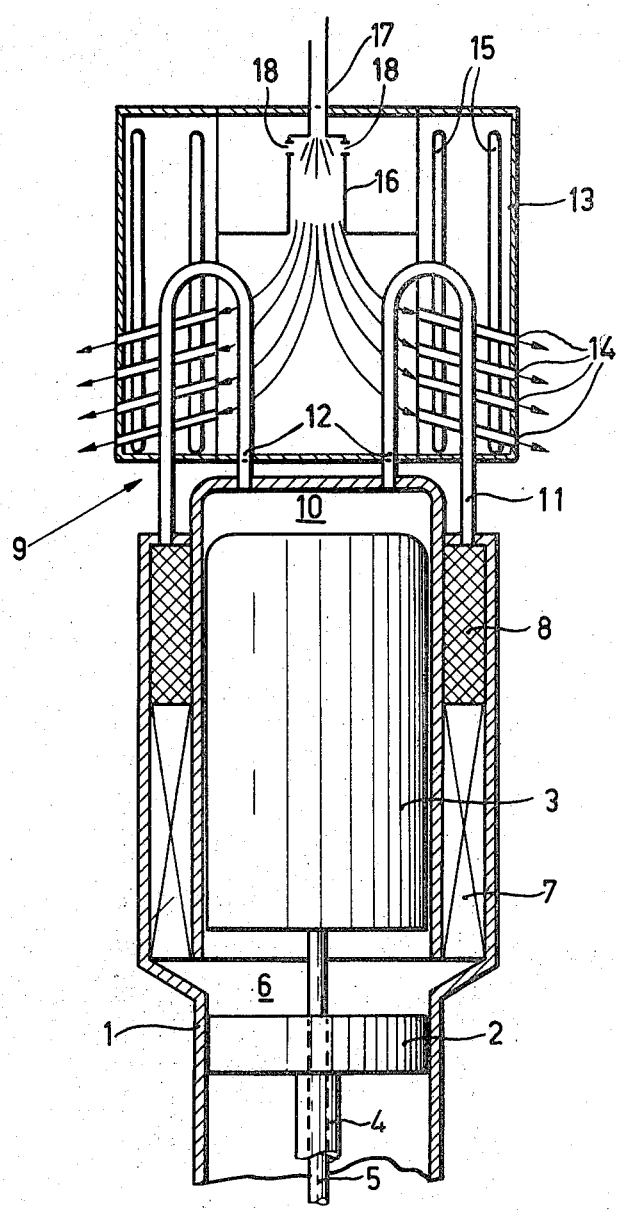

HOT-GAS ENGINE

This is a continuation, of application Ser. No. 026,639, filed Apr. 8, 1970 now abandoned.

The invention relates to a hot-gas engine having a compression space of a variable volume and lower average temperature and an expansion space communicating herewith and likewise of variable volume and higher average temperature, a cooler, a regenerator and a heater being arranged in the communication between said spaces, to the latter of which thermal energy can be supplied by means of a heater system which can conduct a flow of heated medium along the heater, the heater being in thermal communication with at least one container in which a substrate or a mixture of substances is present in which sensible and/or melting heat can be stored.

A hot-gas engine of the type to which the present invention relates is described in Dutch patent specification 60007. In this known hot-gas engine the heater is in thermal communication with a container in which a substance is present having a melting point higher than 500°C but lower than the melting point of the material of the heater. This container serves as a heat accumulator from which thermal energy can be withdrawn at those instances at which the engine must supply more power than its normal full-load power. As described in said patent specification, the periods of overload are of only a very short duration so that a small container is sufficient.

It is the object of the invention to provide a hot-gas engine having a heat accumulating container which can operate for a longer period of time, for example, during a stay in spaces in which exhaust gases are not permissible, on only the thermal energy present in a heat accumulating container and which is of such a construction that the engine can be started immediately from the cold condition by means of the heater device and in which during operation the heat accumulating container always has the desirable operating temperature.

In order to achieve this, the hot-gas engine according to the invention is characterized in that the heater is formed by a first wreath of pipes which communicate at their one end with the expansion space and at their other end communicate with further pipes which communicate with the regenerator, the further pipes being situated at least partly within the said container, the container in the zone over which the furtherpipes extend within the container comprising a number of ducts which extend between the boundary surface facing the first wreath of pipes and the boundary surface of the container remote therefrom, all this in such manner that the heating medium after passage of the first wreath of pipes flows away through said ducts.

In this manner a hot-gas engine is obtained which, since the heating medium which originates, for example, from a burner, is in direct contact with the innermost wreath of pipes, can immediately be started from the fully cold condition and can supply already a considerable part of its full-load power. After passage of the innermost wreath of pipes the heating medium flows through the ducts in the container, the substance present in said container, for example, LiF, being melted and maintained at or above the melting temperature. Instead of using a substance which is caused to melt, a substance may be used in circumstances, for example, $Al_2O_3$, in which only sensible heat is stored. So during normal operation the heater is directly heated throughout the length of pipe partly by the heating medium (fumes) and partly through the substance in the container.

Local overheating of the container by the hot heating medium cannot occur because this medium first passes the innermost wreath of pipes and gives off, already there, a part of its thermal energy to the engine. The container will always be ready for operation, that is to say, will show a high temperature so that after switching off the heating system, thermal energy can immediately be supplied to the engine from the container. During this so-called heat buffer operation, only the further pipes will be heated so that some power reduction will occur. In order to be able to store a sufficient quantity of thermal energy in the container, it may be necessary in circumstances to cause the container to extend beyond the immediate proximity of the pipes. In order nevertheless to use in that case all the stored thermal energy as efficiently as possible, the heat withdrawal must be carried out reasonably uniformly. In order to achieve this, according to the invention, readily heat conducting elements are arranged in the container, which elements thermally connect points of the container which have farther remote from the further pipes to the further pipes or to places which are situated near said pipes.

These readily heat-conducting elements according to a further embodiment are each formed by a closed system of evaporation-condensation. This system comprises a substance having a boiling point which lies in the proximity of the operating temperature of the substance in the container. This type of heat conducting elements is known as "heat pipes." The substance contained therein is, for example, sodium which, by evaporation on the side where thermal energy is supplied and condensation at the cooler end of the pipe, can transport a very large quantity of thermal energy, without a noteworthy temperature difference between the two ends of the pipe.

In order that the invention may be readily carried into effect, one embodiment of a hot-gas engine with burner and heat buffer will not be described in greater detail, by way of example, with reference to the accompanying diagrammatic drawing, which is not drawn to scale.

Reference numeral 1 denotes a cylinder in which a piston 2 and a displacer 3 reciprocate. The piston and displacer are connected to a driving mechanism (not shown) by means of a piston rod 4 and a displacer rod 5, respectively. Between the piston 2 and the lower side of the displacer 3, a compression space 6 as is situated which communicates with an expansion space 10 via a cooler 7, a regenerator 8 and a heater 9. The heater 9 is formed by an outermost wreath of further pipes 11 which communicate at their one end with the regenerator 8 and at their other end communicate with an innermost wreath of pipes 12 which communicate with the expansion space 10. In order to avoid complexity of the drawing, only two pipes of each wreath of pipes are shown.

The outermost wreath of pipes 11 is incorporated in an annular container 13 which is filled with LiF. The zone of the container 13 over which the pipes 11 extend within said container comprises a number of ducts 14 which extend between the inner and the outer wall of the container. A number of "heat pipes" 15 are arranged in the container 13. These heat pipes 15 are closed pipes filled with Na.

A burner 16 is present above the innermost wreath of pipes to which burner fuel can be supplied *via* inlet 17 and to which air can be supplied *via* aperture 18, which air is preheated in a preheater not shown. The operation of the hot-gas engine is supposed to be known.

Thermal energy is supplied to the heater by the burner 16. The fumes of said burner first pass the innermost wreath of pipes 12, heat being given off to the working medium of the engine. The fumes then flow through the ducts 14 in the container 13. Heat is given off to the LiF in the container. The supplied thermal energy is evenly distributed over the container by the heat pipes 15. In course of time the LiF will be melted. All the thermal energy of the fumes is then given off to the engine partly by direct contact of the fumes with the pipes 11 and partly *via* the melted LiF to the pipes 11. When the engine comes in a space in which no fumes may be exhausted, the burner can be switched off and the engine can continue to operate with the thermal energy present in the melted LiF. Since thermal energy is supplied only to the pipes 11, some power reduction will occur. The heat pipes 15 ensure that the thermal energy is withdrawn as evenly as possible everywhere from the container 13 so that a very efficient use of the stored thermal energy is obtained.

In this manner an extremely readily operating construction is obtained of a hot-gas engine with a combined burner and heat buffer system.

The hot-gas engine according to the invention can immediately be started from the fully cold condition and supply a large part of its full-load power because the fumes are in direct contact with the inner-most wreath of pipes 12.

During operation the container 13 is always at the operating temperature, so that after extinguishing of the burner 16, there can immediately be switched to heat buffer operation.

Local overheating of the container 13 is substantially excluded since the fumes first flow along the innermost wreath of pipes 12 and are thereby cooled and only then contact the container 13. Furthermore, the thermal energy is very readily distributed over the container 13 by the heat pipes 15.

What is claimed is:

1. A hot-gas engine having a compression space of a variable volume and lower average temperature and an expansion space communicating therewtih and likewise of variable volume and higher average temperature, a cooler, a regenerator and a heater being arranged in the communication between said spaces, to the latter of which thermal energy can be supplied by means of a heater system which can conduct a flow of heated medium along the heater, the heater being in thermal communication with at least one container in which a substance or a mixture of substances is present, in which sensible and/or melting heat can be stored, characterized in that the heater is formed by a first wreath of pipes which communicate at their one end with the expansion space and at their other end communicate with further pipes which communicate with the regenerator, the further pipes being situated at least partly within the said container, the container comprising, in the zone over which the further pipes extend in the container, a number of ducts which extend between the boundary surface facing the first wreath of pipes and the boundary surface of the container remote therefrom, all this in such manner that the heating medium after passage of the first wreath of pipes flows away through said ducts.

2. A hot-gas engine as claimed in claim 1, characterized in that readily heat conducting elements are arranged in the said container, which elements thermally connect points of the container which are situated farther remote from the further pipes to the further pipes or to places which are situated near said pipes.

3. In a hot gas engine having variable volume compression and expansion spaces respectively of lower and higher average temperature, these spaces being in communication with each other via a cooler and a regenerator arranged between said spaces, the improvement in combination therewith of a heating system for supplying thermal energy to the expansion space comprising an annular container having inner and outer boundary surfaces and containing in the inner space between said surfaces a substance in which sensible and/or melting heat can be stored, a burner for supplying a flow of heated medium, and a heater including pipe means having first and remote parts respectively in communication with said expansion space and the regenerator, the first part being adjacent said burner and the remote part being at least partly within said container, and duct means traversing said inner space of the container with outer walls of the duct in contact with said said substance, whereby said medium from the burner contacts and transfers heat to said first part of said pipe means, the medium then flows through said duct means transferring heat from the medium through the duct walls to the substance within the container, this heat in the substance being transferrable to said remote part of the pipe means within the container.

4. Apparatus according to claim 3 wherein said heating system further comprises heat pipe elements disposed within said container, each of said heat pipes thermally connecting portions of the container near said remote parts of said pipe means with remote portions of said container.

5. Apparatus according to claim 4 wherein said heat pipes each comprise a closed evaporation-condensation heat transfer system.

6. Apparatus according to claim 3 wherein said substance within said container is a material such as LiF or $Al_2O_3$.

7. Apparatus according to claim 4 wherein said heat pipes comprise therein Na.

8. Apparatus according to claim 3 wherein said pipe means comprises a first wreath of pipes within the inner boundary of the container defining said first part of the pipe means, and each of said pipes extends into said container and to the regenerator as said remote part of said pipe means, these remote parts defining an outer wreath of pipes.

* * * * *